United States Patent
Yasuda et al.

(10) Patent No.: US 6,929,280 B2
(45) Date of Patent: Aug. 16, 2005

(54) AIRBAG APPARATUS FOR AUTOMOBILE

(75) Inventors: Mitsuo Yasuda, Fukumitsu-machi (JP); Yoshiharu Nakashima, Fukumitsu-machi (JP)

(73) Assignee: Sanko Gosei Kabushiki Kaisha, Toyama-Ken (JP)

( * ) Notice: Subject to any disclaimer, the term of this patent is extended or adjusted under 35 U.S.C. 154(b) by 61 days.

(21) Appl. No.: 10/392,132

(22) Filed: Mar. 18, 2003

(65) Prior Publication Data

US 2003/0184063 A1 Oct. 2, 2003

(30) Foreign Application Priority Data

Mar. 28, 2002 (JP) ........................................ 2002-091998
Nov. 18, 2002 (JP) ........................................ 2002-333712

(51) Int. Cl.$^7$ ............................................. B60R 21/20
(52) U.S. Cl. ................................ 280/728.2; 280/728.3; 280/732
(58) Field of Search .............................. 280/728.3, 732, 280/728.2, 730.1

(56) References Cited

U.S. PATENT DOCUMENTS

| | | | |
|---|---|---|---|
| 4,148,503 A | 4/1979 | Shiratori et al. | 280/731 |
| 5,183,288 A | 2/1993 | Inada et al. | 280/732 |
| 5,322,324 A | 6/1994 | Hansen et al. | 280/732 |
| 5,411,288 A | 5/1995 | Steffens, Jr. | 280/728.3 |
| 5,549,324 A | 8/1996 | Labrie et al. | 280/728.3 |
| 5,569,959 A | 10/1996 | Cooper et al. | 280/728.3 |
| 5,685,560 A | 11/1997 | Sugiyama et al. | 280/731 |

(Continued)

FOREIGN PATENT DOCUMENTS

| | | | | |
|---|---|---|---|---|
| JP | 06-144142 | 5/1994 | | |
| JP | 07-172256 | 7/1995 | | |
| JP | 07-291078 | 11/1995 | | |
| JP | 10-044910 | 2/1998 | | |
| JP | 11-198752 | 7/1999 | | |
| JP | 2001-206180 A | 7/2001 | | |
| JP | 2001294114 A | * | 10/2001 | B60R/21/20 |

*Primary Examiner*—Peter C. English
(74) *Attorney, Agent, or Firm*—Ladas & Parry LLP

(57) ABSTRACT

An airbag apparatus for an automobile includes an airbag case for accommodating an airbag in a folded condition, the airbag case being disposed behind a surface panel which is made of a thermoplastic resin material and provided within the automobile; a fracture-opening section of the surface panel, the fracture-opening section facing an opening of the airbag case and being defined by means of fracture grooves formed on an inside surface of the surface panel; at least one reinforcement plate member fixed to the inside surface of the surface panel in a region corresponding to the fracture-opening section; and a frame member surrounding the reinforcement plate member and fixed to the inside surface of the surface panel in a region surrounding the fracture-opening section. The frame member and the reinforcement plate member are each made of a thermoplastic resin material, and are fixed to the inside surface of the surface panel through vibration welding.

4 Claims, 9 Drawing Sheets

U.S. PATENT DOCUMENTS

| | | | |
|---|---|---|---|
| 5,738,367 A | 4/1998 | Zichichi et al. | 280/728.3 |
| 5,769,451 A | 6/1998 | Inada et al. | 280/732 |
| 5,779,262 A | 7/1998 | Totani et al. | 280/728.3 |
| 5,806,879 A | 9/1998 | Hamada et al. | 280/728.2 |
| 5,816,609 A | 10/1998 | Gray et al. | 280/728.3 |
| 5,839,752 A | 11/1998 | Yamasaki et al. | 280/728.3 |
| 5,863,064 A | 1/1999 | Rheinlander et al. | 280/732 |
| 5,865,461 A | 2/1999 | Totani et al. | 280/728.3 |
| 5,868,419 A | 2/1999 | Taguchi et al. | 280/728.3 |
| 5,961,142 A | 10/1999 | Shiraki et al. | 280/728.3 |
| 6,012,735 A | 1/2000 | Gray et al. | 280/728.3 |
| 6,070,901 A | 6/2000 | Hazell et al. | 280/728.3 |
| 6,076,851 A | 6/2000 | Davis, Jr. et al. | 280/728.2 |
| 6,079,734 A | 6/2000 | Porter | 280/728.3 |
| 6,089,642 A | 7/2000 | Davis, Jr. et al. | 296/70 |
| 6,109,645 A | 8/2000 | Totani et al. | 280/728.3 |
| 6,161,865 A | 12/2000 | Rose et al. | 280/728.3 |
| 6,203,056 B1 | 3/2001 | Labrie et al. | 280/728.3 |
| 6,250,669 B1 | 6/2001 | Ohmiya | 280/732 |
| 6,299,198 B1 | 10/2001 | Nakashima et al. | 280/728.3 |
| 6,318,752 B1 * | 11/2001 | Warnecke et al. | 280/728.3 |
| 6,340,170 B1 | 1/2002 | Davis et al. | 280/730.1 |
| 6,394,485 B1 | 5/2002 | Amamori | 280/728.2 |
| 6,406,056 B2 | 6/2002 | Yokota | 280/728.2 |
| 6,435,542 B2 | 8/2002 | Nakashima et al. | 280/728.3 |
| 6,494,481 B2 | 12/2002 | Yasuda | 280/732 |
| 6,595,543 B2 * | 7/2003 | Desprez | 280/728.3 |
| 6,623,029 B2 * | 9/2003 | Sun et al. | 280/728.3 |
| 6,692,017 B2 * | 2/2004 | Taoka et al. | 280/728.3 |
| 6,719,320 B2 * | 4/2004 | Gray et al. | 280/728.3 |
| 6,761,375 B2 * | 7/2004 | Kurachi et al. | 280/728.3 |
| 2002/0005630 A1 | 1/2002 | Suzuki et al. | 280/728.3 |
| 2003/0011178 A1 * | 1/2003 | Choi et al. | 280/732 |
| 2003/0067145 A1 * | 4/2003 | Yasuda et al. | 280/728.3 |
| 2004/0026902 A1 * | 2/2004 | Yasuda et al. | 280/728.2 |

* cited by examiner

AIRBAG APPARATUS FOR AUTOMOBILE

CROSS REFERENCE TO RELATED APPLICATIONS

The subject matter of the present application may also be related to the following U.S. patent applications: "Structure of Reinforcement Plate Member Used in Automobile Airbag Apparatus," Ser. No. 09/843,083, filed Apr. 25, 2001; "Airbag Device for Use in a Vehicle," Ser. No. 09/975,665, filed Oct. 10, 2001; "Airbag Apparatus for Automobile," Ser. No. 10/008,862, filed Nov. 7, 2001; "Airbag Apparatus for Automobile," Ser. No. 10/449,135, filed May 28, 2003; "Airbag Apparatus for Front Passenger Seat," Ser. No. 09/847,550, filed May 2, 2001 (now U.S. Pat. No. 6,435,542), and "Airbag Apparatus for Front Passenger Seat," Ser. No. 09/836,664, filed Apr. 17, 2001 (now U.S. Pat. No. 6,494,481).

BACKGROUND OF THE INVENTION

1. Field of the Invention

The present invention relates to an airbag apparatus for an automobile for protecting a person in an automobile such as a car; for example, a driver or a passenger sitting in the front passenger seat, from impact upon head-on or side collision of the automobile to thereby ensure safety of the person. More particularly, the invention relates to an improvement in the structure for attachment of a reinforcement member.

2. Description of the Related Art

An airbag apparatus for a front passenger seat or a driver seat of an automobile, such as a car, or that to be mounted on a side pillar of the automobile basically includes an airbag, an airbag case for accommodating the folded airbag, and an inflater for inflating the airbag. The airbag apparatus is disposed inside an interior surface panel of the automobile.

A typical example of such an interior surface panel is an instrument panel cover which is made of a thermoplastic resin material, such as polypropylene, and which covers the surface of an instrument panel core formed integrally from a thermoplastic resin material, such as polypropylene.

Japanese Patent Application Laid-Open (kokai) No. 2001-206180 discloses a conventional seamless-type airbag apparatus for a front passenger seat. As shown in FIGS. 1 and 2, the seamless-type airbag apparatus is designed to render a fracture groove of a fracture-opening section of an instrument panel cover invisible.

Specifically, as shown in FIGS. 1 and 2, the instrument panel cover 10 has a fracture-opening section 14 having a size corresponding to that of an opening portion 13a of an airbag case 13. The fracture-opening section 14 is formed through provision of front and back hinge grooves 10a extending longitudinally, a center fracture groove 10b extending longitudinally, and side fracture grooves 10c extending transversely. These grooves 10a, 10b, and 10c are formed on the inside surface of the instrument panel cover 10 by use of a laser. Specifically, a pulsating laser beam is perpendicularly applied to the inside surface of the instrument panel cover 10 while being moved along peripheral edges of a pair of reinforcement plate members 11 fixed to the inside surface, thereby forming the grooves 10a, 10b, and 10c.

The longitudinally extending center fracture groove 10b and the side fracture grooves 10c formed perpendicularly to the fracture groove 10b divide the fracture-opening section 14 into a front fracture-opening subsection 15a and a rear fracture-opening subsection 15b. Upon inflation of an airbag, the fracture-opening subsections 15a and 15b are split apart from each other in a casement condition (in opposite directions) while hinging on the front and rear hinge grooves 10a and 10b.

When, upon inflation of an airbag, the fracture-opening section 14 of the instrument panel cover 10 is split open by pressure of the inflating airbag 12, the front and rear hinge groove 10a may be broken, with a resultant separation of the fracture-opening subsections 15a and 15b from the instrument panel cover 10. In order to avoid this problem, the conventional air bag apparatus employs a reinforcing structure including the above-mentioned paired reinforcement plate members 11, which are provided on the inside surface of the fracture-opening section 14 of the instrument panel cover 10. Specifically, a frame-shaped reinforcement rib 16 is formed integrally with the instrument panel cover 10 in such a manner that the rib 16 projects from the inside surface of the instrument panel cover 10, and the rib 16 defines a rectangular space slightly larger than the opening portion 13a of the airbag case 13. The paired reinforcement plate members 11 are disposed within the rectangular space defined by the rib 16. The horizontal portions 11a of the reinforcement plate members 11 are fixedly attached to the inside surface of the fracture-opening section 14 through thermal joining or like processing. Vertical portions 11b of the reinforcement plate members 11 are bent at their hinge portions 11c and extend downward along the inner surfaces of front and rear walls of the reinforcement rib 16. The front and rear walls of the reinforcement rib 16 and the corresponding vertical portions 11b of the reinforcement plate members 11 are engaged with corresponding hooks 17 attached to front and rear walls 13b of the airbag case 13. The reinforcement plates 11 prevent scattering of the fracture-opening subsections 15a and 15b of the fracture-opening section 14 of the instrument panel cover 10 upon inflation of the airbag.

In order to allow the fracture-opening subsections 15a and 15b to be split open smoothly, hook engagement holes 11d formed in the vertical portions 11b of the paired reinforcement plate members 11 assume a sufficiently large size so as to allow upward movement of the vertical portions 11b when the fracture-opening subsections 15a and 15b are split open.

The thus-configured airbag apparatus functions in the following manner. Upon collision of the automobile, an impact force caused by the collision is detected by a sensor. A control unit including a CPU judges whether or not the detected impact force is equal to or greater than a predetermined value. When the control unit judges that the impact force is equal to or greater than the predetermined value, the control unit issues a signal for causing the inflater to generate a predetermined gas. The gas is fed to the airbag so as to promptly inflate the airbag.

The inflating airbag presses, from inside, the fracture-opening section 14 of the instrument panel cover 10. The fracture-opening section 14 is fractured along the center fracture groove 10b and the side fracture grooves 10c, whereby the fracture-opening subsections 15a and 15b are split open about the front and rear hinge grooves 10a. The thus-opened front and rear fracture-opening subsections 15a and 15b are further opened while being turned inside out about the hinge portions 11c of the reinforcement plate members 11.

Simultaneously, the inflating airbag 12 projects outward from the instrument panel cover 10 through the thus-opened fracture-opening section 14. Serving as a cushion, the inflated airbag 12 supports a front seat passenger at his/her chest and head, thereby protecting the passenger from the impact force of collision.

In the above-described airbag apparatus, the reinforcement plate members 11 and the reinforcement rib 16 are provided on the inside surface of the instrument panel cover 10 in a peripheral region around the fracture-opening section 14. However, in order to facilitate the installation work of the airbag case 13 and fracture-opening of the fracture-opening subsections 15a and 15b, vertical play is provided between the hook engagement holes 1id and the hooks 17. That is, the reinforcement plate members 11 and the reinforcement rib 16 are not configured to support a pressing force imposed from above; i.e., a pressing force imposed on the instrument panel cover 10. If a load is mistakenly imposed on the instrument panel cover 10, the hinge grooves 10a, the center fracture groove 10b, and/or the side fracture grooves 10c may be fractured. As a result, the fracture-opening section 14 is dented or the peripheral edge of the fracture-opening section 14 is deformed, thereby damaging the appearance of the instrument panel cover 10.

In the conventional airbag apparatus, the pair of reinforcement plate members 11 are fixed to the inside surface of the fracture-opening section 14 of the instrument panel cover 10 so as to extend frontward and rearward, respectively, from the central fracture groove 10b. However, since the reinforcement plate members 11 are each formed of a metallic plate, the metallic plates are exposed when the reinforcement plate members 11 are turned inside out upon inflation of the air bag, and this is not desirable from the viewpoint of safety. Further, during recycling, the reinforcement plate members 11 formed of metallic plates must be separated from the instrument panel cover 10 formed of plastic. However, this separation work is cumbersome, because the reinforcement plate members 11 are fixedly secured to the instrument panel cover 10 by means of thermal joining or like processing.

SUMMARY OF THE INVENTION

In view of the foregoing, an object of the present invention is to provide an airbag apparatus for an automobile exhibiting improved resistance to a pressing load imposed externally on a fracture-opening section and its peripheral region of a surface panel covering an instrument panel region, a side pillar region, or a central portion of a steering wheel of an automobile.

Another object of the present invention is to provide an airbag apparatus for an automobile in which reinforcing plate members fixedly secured to the inside surface of a fracture-opening section of a surface panel are formed of a thermoplastic resin material as in the case of the surface panel, to thereby enable the surface panel and the reinforcing plate members to be joined through vibration welding, facilitate assembly, and eliminate the necessity of disassembly work at the time of recycling.

To achieve the above objects, the present invention provides an airbag apparatus for an automobile, comprising: an airbag case for accommodating an airbag in a folded condition, the airbag case being disposed behind a surface panel which is made of a thermoplastic resin material and provided within the automobile; a fracture-opening section of the surface panel, the fracture-opening section facing an opening of the airbag case and being defined by means of fracture grooves formed on an inside surface of the surface panel; at least one reinforcement plate member fixed to the inside surface of the surface panel in a region corresponding to the fracture-opening section; and a frame member surrounding the reinforcement plate member and fixed to the inside surface of the surface panel in a region surrounding the fracture-opening section. The frame member and the reinforcement plate member are each made of a thermoplastic resin material, and are fixed to the inside surface of the surface panel through vibration welding.

The reinforcement plate member may be made of a first thermoplastic resin material and having a certain rigidity; and the frame member may be made of a second thermoplastic resin material containing a reinforcing material and having an rigidity greater than that of the first thermoplastic resin material. In this case, the first thermoplastic resin material may be olefin elastomer or urethane elastomer; and the second thermoplastic resin material may be polypropylene.

The frame member and the reinforcement plate member may be made of olefin elastomer or urethane elastomer.

Since the surface panel, the frame member, and the reinforcement plate member are formed of thermoplastic resin materials, these members can be joined together by means of vibration welding, which facilitates welding work. Further, the above-described configuration eliminates disassembly work which has conventionally been performed, during recycling, in order to separate frame members and reinforcement plate members formed of metallic plates from surface panels formed of plastic.

Preferably, the frame member includes a tubular body portion which extends substantially perpendicular to the fracture-opening section and to which a vertical portion of the reinforcement plate member is connected, and reinforcement edge portions extending outward from the body portion and facing the inside surface of the surface panel; and the reinforcement edge portions are fixed, by means of vibration welding, to the inside surface of the surface panel in a region surrounding the fracture-opening section.

The frame member having reinforcement edge portions for reinforcing the portion of the surface panel around the fracture-opening section, and the reinforcement plate member for reinforcing the fracture-opening section are separately formed and joined together during assembly. Therefore, assembly work is facilitated. Further, when a pressing force is imposed on the upper surface of the surface panel, the reinforcement edge portions of the frame member support the surface panel, thereby preventing occurrence of a dent in the fracture-opening section and deformation of the peripheral edge of the fracture-opening section.

Preferably, the frame member and the reinforcement plate member are separably connected to the airbag case.

When a car is to be scrapped, the airbag case can be easily detached from the frame member and the reinforcement plate member, so that an inflater and other relevant components can be easily removed for proper disposal to thereby prevent potential environmental contamination.

Preferably, ridges are formed at predetermined intervals on surfaces of the frame member and the reinforcement plate member, the surfaces being to face the inside surface of the surface panel; and the frame member and the reinforcement plate member are fixed, by means of vibration welding, to the inside surface of the surface panel via the ridges.

In this case, vibration welding can be performed easily, because of provision of ridges on the frame member and the reinforcement plate member.

Preferably, the body portion of the frame member and the vertical portion of the reinforcement plate member are coupled with each other by means of a dovetail joint; and rectangular holes for receiving and holding hooks of the airbag case are formed in the body portion of the frame member and the vertical portion of the reinforcement plate member at positions corresponding to those of the hooks.

Since the frame member and the reinforcement plate member can be coupled with each other by means of a dovetail joint, assembly work is facilitated considerably. Further, pressure that acts on the hinge portion (bent portion) in an initial state of inflation of the airbag can be absorbed by means of flexibility of the reinforcement plate member and the dovetail joint between the frame member and the reinforcement plate member. Therefore, the fracture-opening section can be opened smoothly. In addition, pressure that acts on a portion of the surface panel around the fracture-opening section can be absorbed, so that formation of a sharp edge or burrs on a fracture surface of the fractured fracture-opening section can be prevented, thereby providing a neat fracture surface.

Preferably, the rectangular holes formed in the vertical portion of the reinforcement plate member are greater in opening area than the rectangular holes formed in the body portion of the frame member; and the lower edges of the rectangular holes formed in the vertical portion of the reinforcement plate member are located below the lower edges of the rectangular holes formed in the body portion of the frame member when the reinforcement plate member is coupled to the frame member.

This configuration enhances the above-described operation for absorbing pressure that acts on the hinge portion (bent portion) in an initial state of inflation of the airbag.

The airbag apparatus of the present invention may be configured in such a manner that the surface panel includes a rectangular fracture-opening section, and a center fracture groove and side fracture grooves formed on an inside surface of the surface panel, the side fracture grooves defining shorter sides of the fracture-opening section, and the center fracture groove extending along a longitudinal direction of the fracture-opening section and dividing the fracture-opening section into two subsections; the frame member has a rectangular upper opening corresponding to the rectangular fracture-opening section; the airbag apparatus includes two reinforcement plate members having rectangular horizontal portions fixed to the two subsections, respectively; the frame member have open-motion assisting projections which project inward from opposite edges, respectively, of the upper opening of the frame member, which edges correspond to the shorter sides of the fracture-opening section; and the horizontal portions of the reinforcement plate members are partially cut in order to form cut portions corresponding to the open-motion assisting projections.

In this configuration, pressure generated in an initial sate of inflation of the airbag acts mainly on the center fracture line, so that fracture of the fracture-opening section upon inflation of the airbag reliably proceeds from the center fracture groove to the side fracture grooves.

The airbag apparatus of the present invention may be configured in such a manner that the surface panel includes a quadrangular fracture-opening section, and a center fracture groove and side fracture grooves formed on an inside surface of the surface panel, the side fracture grooves defining shorter sides of the fracture-opening section, and the center fracture groove extending along a longitudinal direction of the fracture-opening section and dividing the fracture-opening section into two subsections; the airbag apparatus includes two reinforcement plate members having horizontal portions fixed to the two subsections, respectively; the frame member have reinforcement edge portions extending along the shorter sides of the fracture-opening section; the side fracture grooves are curved so as to form convex curved lines whose apexes coincide with opposite ends of the center fracture groove; the reinforcement edge portions each have a flat portion and ridges to be welded to the inside surface of the surface panel, the flat portion extending along the circumferential edge of the opening of the frame member, and the ridges being formed outside the flat portion; and the curved side fracture grooves are located above the corresponding flat portions in such a manner that apex portions of the curved side fracture grooves do not project into the opening of the frame member.

In this configuration as well, pressure generated in an initial state of inflation of the airbag acts mainly on the center fracture line, so that fracture of the fracture-opening section upon inflation of the airbag reliably proceeds from the center fracture groove to the side fracture grooves.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will next be described in detail with reference to the drawings.

FIGS. 3–8 show an airbag apparatus for an automobile according to a first embodiment of the present invention and applied to use with a front passenger seat.

Figure 1:
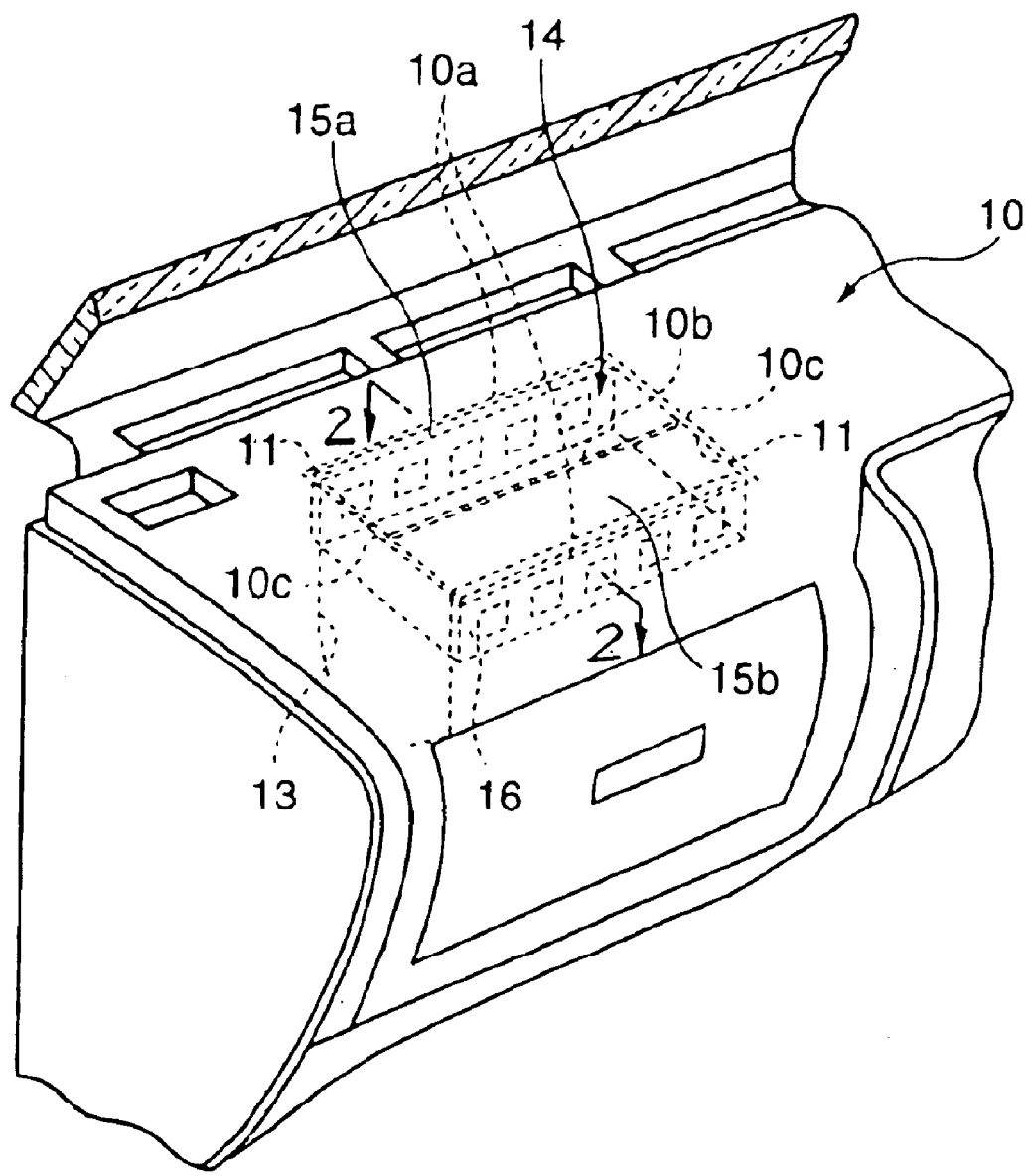
FIG. 1 is a schematic perspective view of a conventional airbag apparatus for a front passenger seat, showing an instrument panel cover having a fracture-opening section for allowing an inflating airbag to project outward therethrough.
Figure 2:
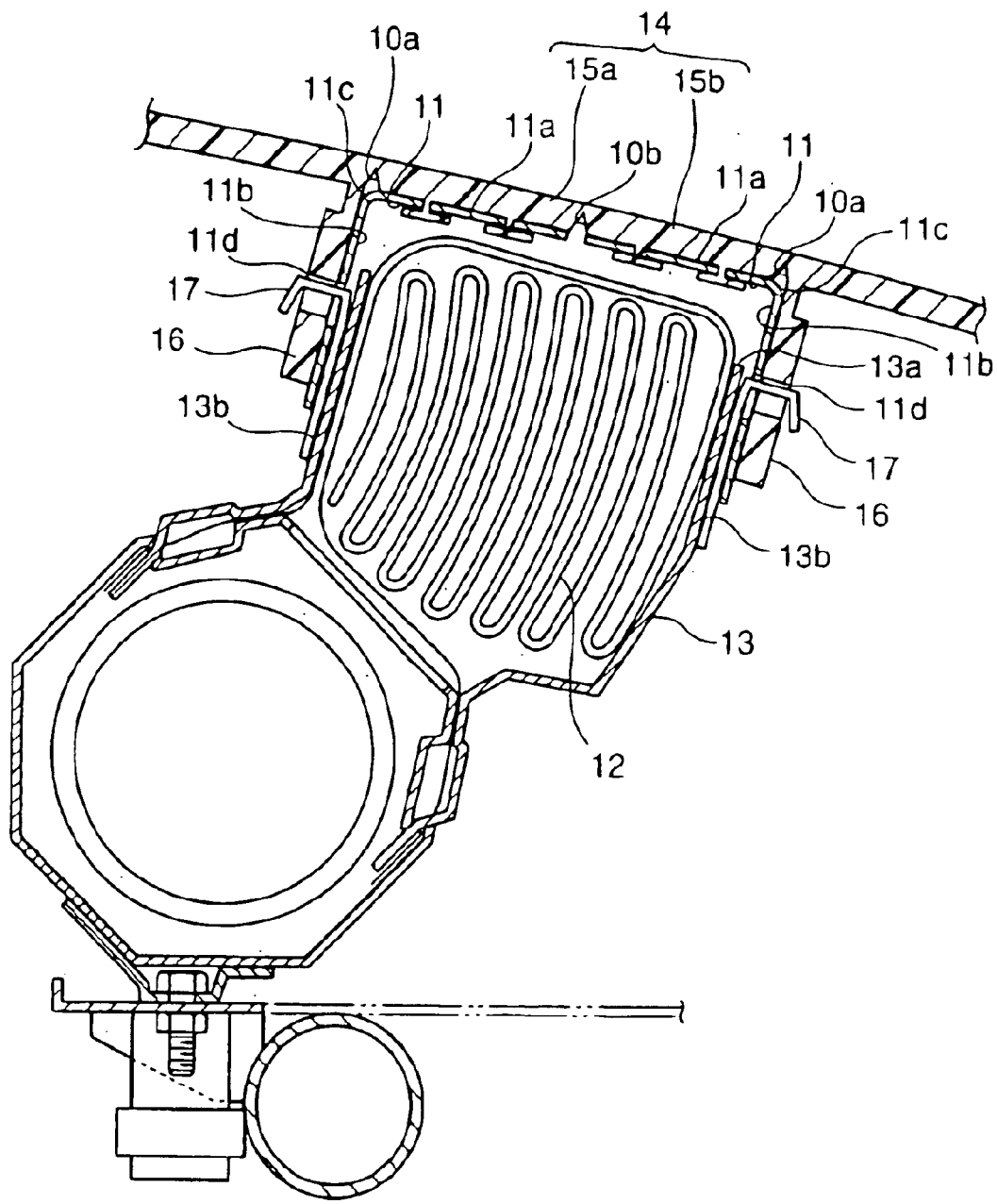
FIG. 2 is a schematic sectional view taken along line 2—2 of FIG. 1.
Figure 3:
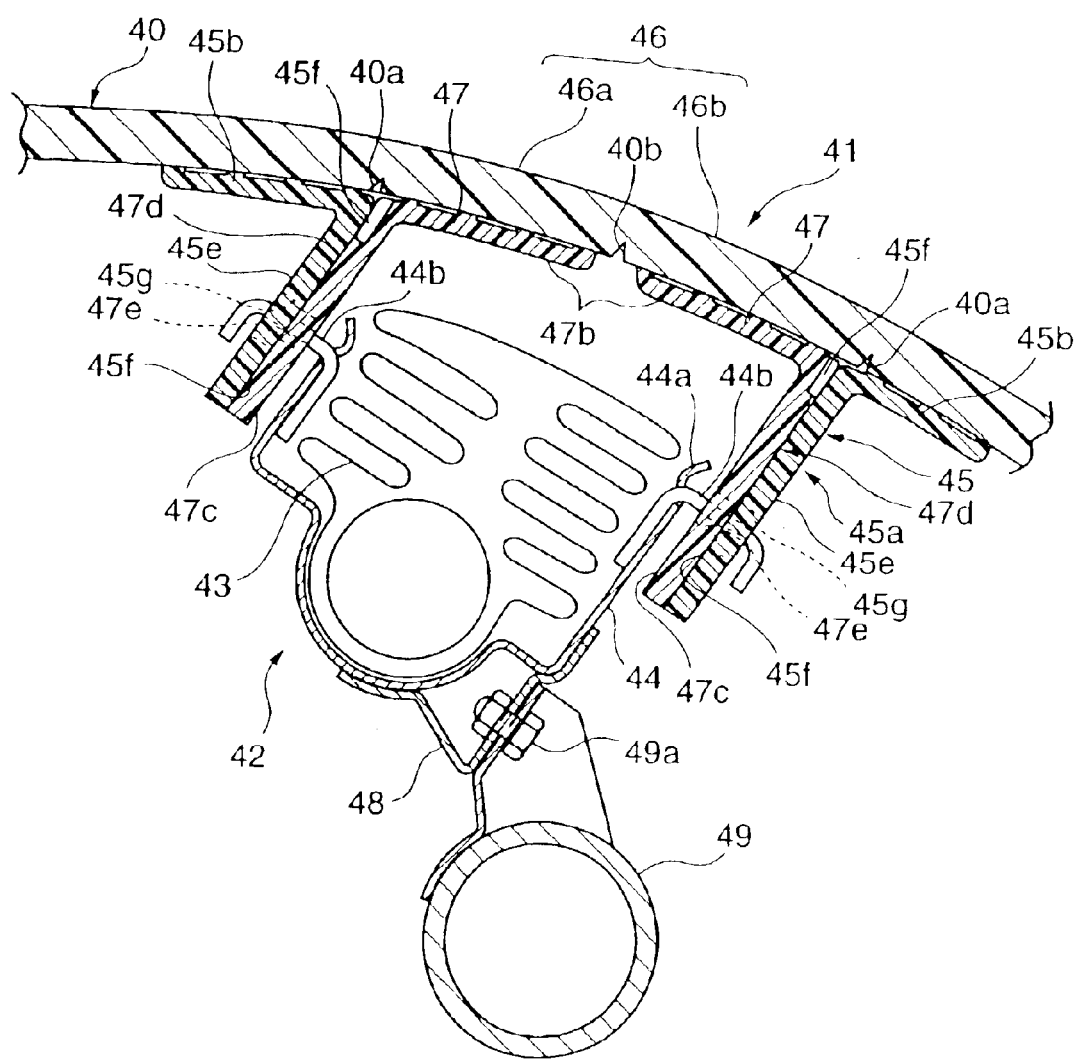
FIG. 3 is a vertical sectional view of a main portion of of an airbag apparatus for an automobile according to a first embodiment of the present invention and applied to use with a front passenger seat.

In FIG. 3, reference numeral 40 denotes an integrally molded instrument panel cover made of, mainly, a thermoplastic resin, such as polypropylene. The instrument panel cover 40, which serves as the surface panel, covers an instrument panel core (not shown) fixed to an unillustrated car body and is fixedly attached to the instrument panel core by use of appropriate means, such as tapping screws.

As shown in FIG. 3, an accommodation section 42 for accommodating an airbag apparatus for an automobile 41 is formed behind a left-hand portion (for right-hand drive) of the instrument panel cover 40 in opposition to a front passenger seat. A left-hand drive automobile employs a mirror image of the configuration of the present embodiment; i.e., the accommodation section 42 is formed behind a right-hand portion of the instrument panel cover 40.

The airbag apparatus for an automobile 41 includes an airbag 43 to be inflated by means of gas from an inflater; an airbag case 44 which accommodates the airbag 43 in a folded condition and which has an opening portion 44a at its upper end; a frame member 45; and a pair of reinforcement plate members 47 for reinforcing a fracture-opening section 46 consisting of front and rear fracture-opening subsections 46a and 46b, which will be described later. The frame member 45 is formed of a thermoplastic resin material which is similar to that of the instrument panel cover 40 but not identical thereto; i.e., the frame member 45 is formed of a thermoplastic material having high rigidity-which contains polypropylene as a predominant component and a reinforcing material such as talc or fiber glass in an amount of 10 to 30% by weight. The reinforcement plate members 47 are formed of a thermoplastic resin material having low rigidity (high flexibility), such as olefin elastomer or urethane elastomer.

The fracture-opening section 46 is formed on the instrument panel cover 40 in opposition to the accommodation section 42. The fracture-opening section 46 is split open upon inflation of the airbag 43.

Figure 4:
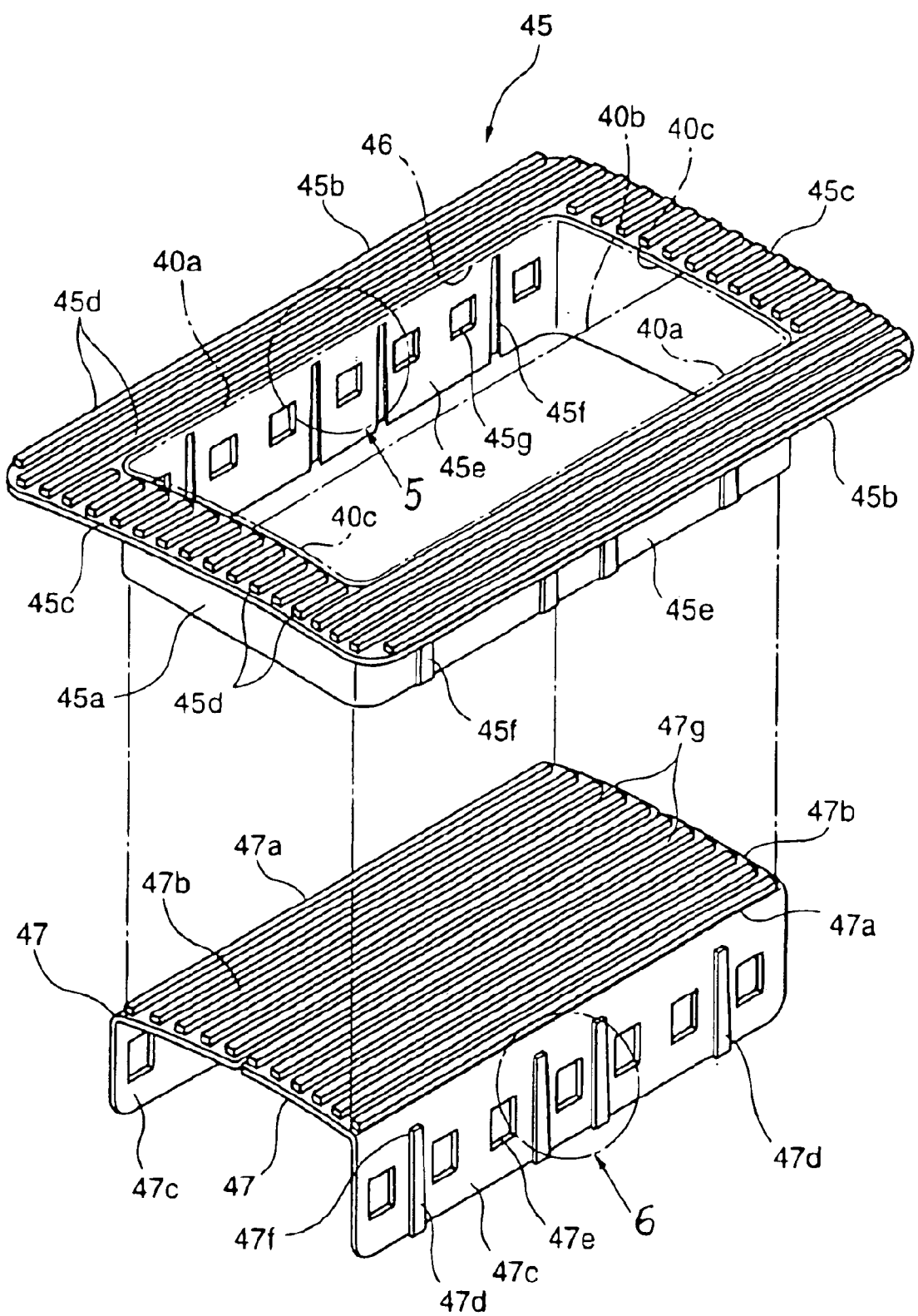
FIG. 4 is an exploded perspective view of a frame member and a reinforcement plate member shown in FIG. 3.
Figure 5A:
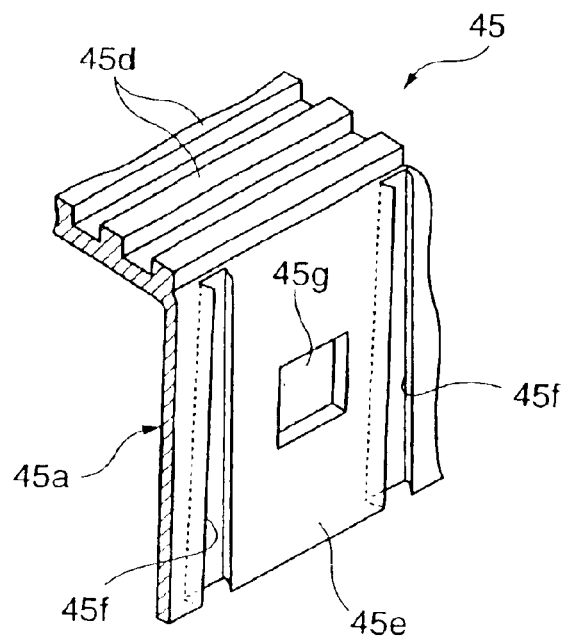
FIGS. 5A and 5B are enlarged perspective views of a portion of the frame member indicated by arrow 5 in FIG. 4, as viewed from different angles.
Figure 5B:
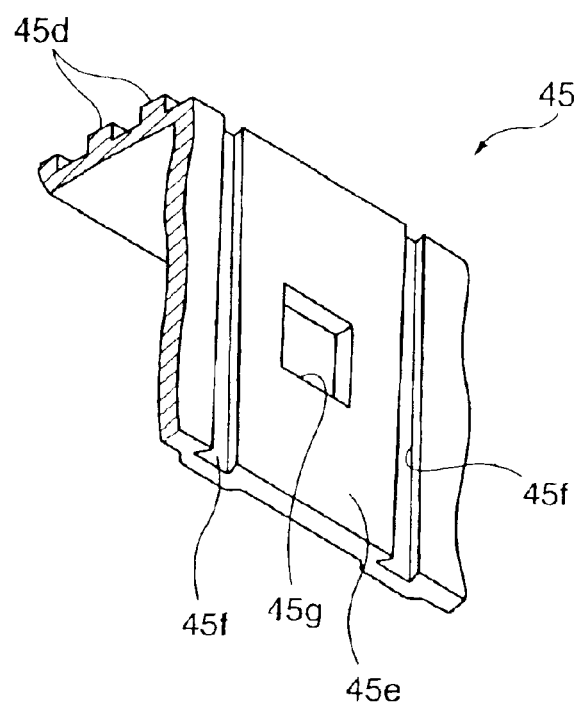
Figure 6:
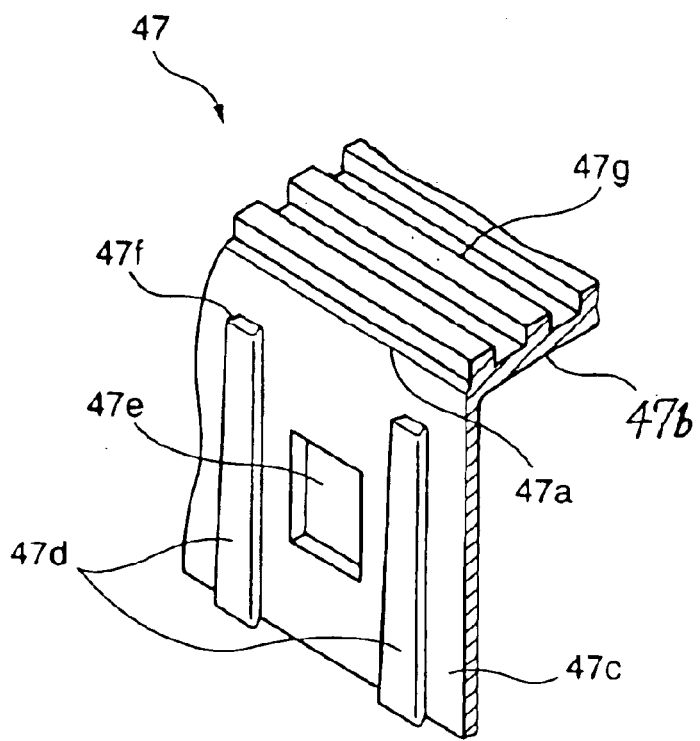
FIG. 6 is an enlarged perspective view of a portion of the reinforcement plate member indicated by arrow 6 in FIG. 4.
Figure 7:
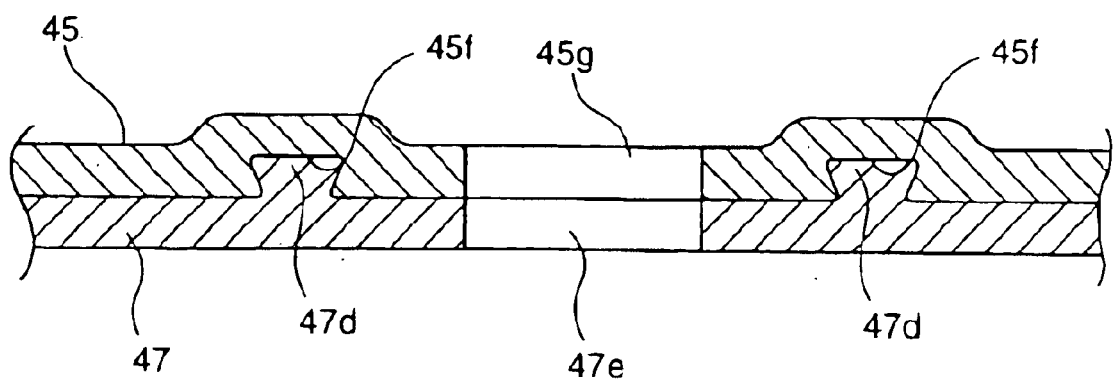
FIG. 7 is a fragmentally enlarged cross section showing a state in which the frame member and the reinforcement plate member are coupled together by means of a dovetail joint.
Figure 8:
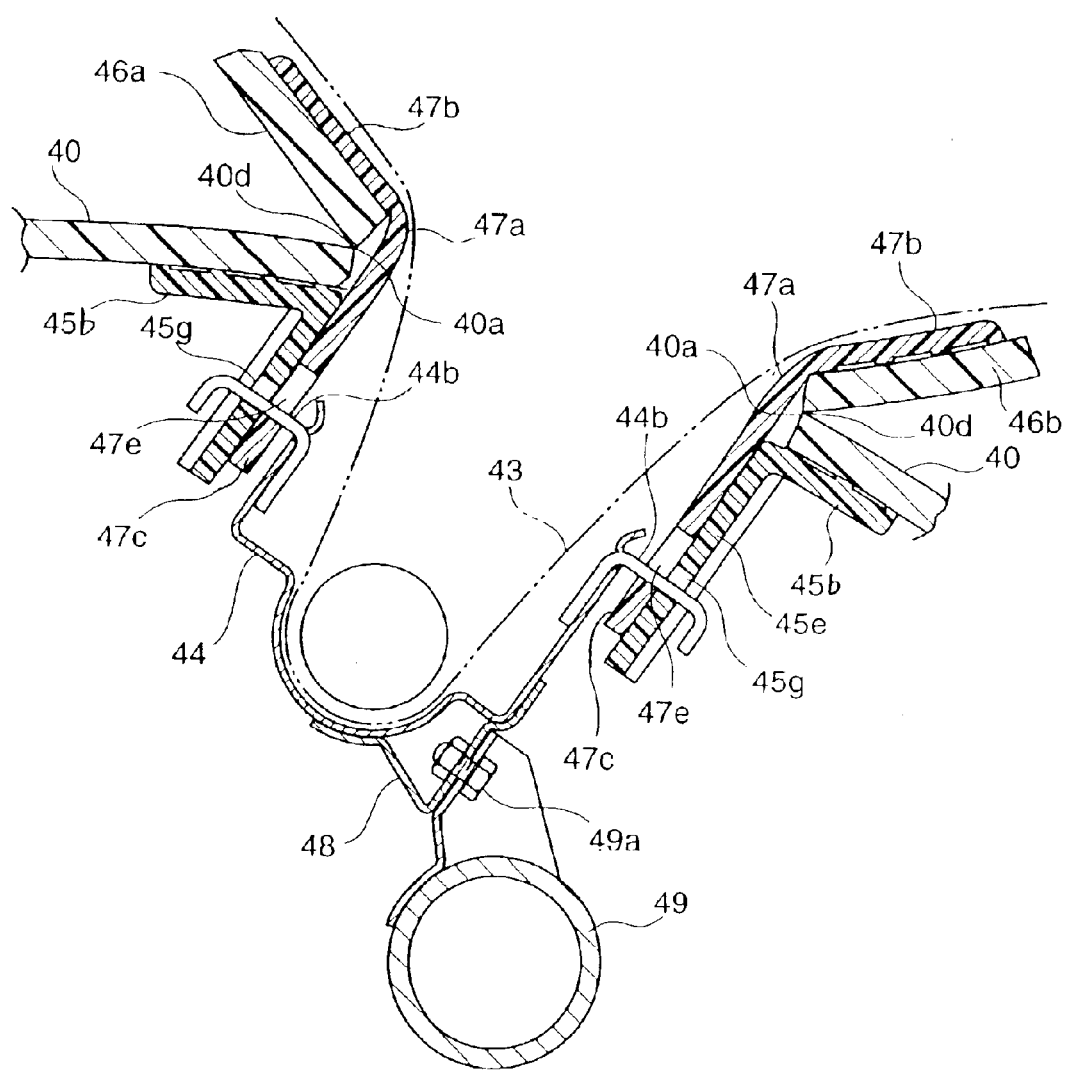
FIG. 8 shows an explanatory sectional view of the airbag apparatus of FIG. 3 in an operated state.

As illustrated by a dashed line in FIG. 4, hinge grooves 40a extending along the longitudinal direction (right-left direction) and side fracture grooves 40c extending along the transverse direction (front-back direction) are formed on the inside surface of the instrument panel cover 40 through laser processing to thereby define the fracture-opening section 46 assuming a rectangular shape substantially identical with that of the opening portion 44a of the airbag case 44. A center fracture groove 40b is formed, through laser processing, on the fracture-opening section 46 along the longitudinal direction of the fracture-opening section 46 in such a manner as to extend between the centers of the side fracture grooves 40c. Upon inflation of the airbag 43, the fracture-opening section 46 is fractured at the side fracture grooves 40c and the center fracture groove 40b. As a result, as shown in FIG. 8, the fracture-opening section 46 is split into fracture-opening subsections 46a and 46b such that the fracture-opening subsections 46a and 46b are turned inside out about hinges 40d, which are implemented by the corresponding hinge grooves 40a, in opposite directions.

As shown in FIG. 4, the frame member 45 assumes the form of a quadrangular prism which has four side walls corresponding to the hinge grooves 40a and the fracture grooves 40c, which define the rectangular fracture-opening section 46.

The frame member 45 is attached to the inside surface of the instrument panel cover 40 at a peripheral region around the fracture-opening section 46. The frame member 45 holds the airbag case 44 such that the opening portion 44a of the airbag case 44 faces the fracture-opening section 46 and is located between the inside surface of the instrument panel cover 40 and the airbag case 44. The frame member 45 has a body portion 45a; front and rear reinforcement edge portions 45b; and right and left reinforcement edge portions 45c. The body portion 45a assumes the shape of a rectangular tube and extends vertically. The front and rear reinforcement edge portions 45b extend frontward and rearward, respectively, at substantially right angles from the corresponding sides of the upper open end of the body portion 45a. The right and left reinforcement edge portions 45c extends rightward and leftward, respectively, at substantially right angles from the corresponding sides of the upper open end of the body portion 45a. The reinforcement edge portions 45b and 45c face the inside surface of the instrument panel cover 40 at a peripheral region around the fracture-opening section 46. Ridges 45d for vibration welding are formed on the top surfaces of the reinforcement edge portions 45b and 45c at constant intervals. The ridges 45d are fixed to the inside surface of the instrument panel cover 40 by means of vibration welding.

A plurality of square holes 45g are formed, at constant intervals, in longitudinally extending side walls 45e of the body portion 45a of the frame member 45. Further, a plurality of dovetail grooves 45f are formed on the inner wall surfaces of the longitudinally extending side walls 45e to be located between the square holes 45g. The dovetail grooves 45f are formed in such a manner that the width of each dovetail groove 45f decreases from its lower end toward its upper end.

Each of the reinforcement plate members 47 has an L-shaped cross section; i.e., has a horizontal portion 47b and a vertical portion 47c, which are connected together by means of a bent portion 47a serving as a hinge. The horizontal portions 47b of the reinforcement plate members 47 face the front and rear fracture-opening subsections 46a and 46b when the reinforcement plate members 47 are fitted into the frame member 45. Engagement projections 47d each having a trapezoidal cross section are formed on the vertical portion 47c of each reinforcement plate member 47 in such a manner that the width of each engagement projection 47d decreases from its lower end toward its upper end 47f, and the engagement projections 47d are received in the corresponding dovetail grooves 45f formed on the inner wall surface of the corresponding side wall 45e of the main body 45a when the reinforcement plate members 47 are fitted into the frame member 45. Further, a plurality of square holes 47e are formed in the vertical portion 47c of each reinforcement plate member 47 at positions such that the square holes 47e face the square holes 45g of the frame member 45 when the reinforcement plate members 47 are fitted into the frame member 45. Notably, the square holes 47e are rendered greater in opening area than the square holes 45g of the frame member 45 in such a manner that the lower edges of the square holes 47e are located below those of the square holes 45g.

As in the case of the top surfaces of the reinforcement edge portions 45b and 45c, ridges 47g for vibration welding are formed on the top surfaces of the horizontal portions 47b of the reinforcement plate members 47 at constant intervals. The ridges 47g are fixed to the inside surface of the fracture-opening section 46 of the instrument panel cover 40 by means of vibration welding.

The reinforcement plate members 47 are connected to the frame member 45 in such a manner that the horizontal portions 47b of the reinforcement plate members 47 can be swung about the bent portions 47a from a position shown in FIG. 3 in which the horizontal portions 47b of the reinforcement plate members 47 close the panel-cover-side opening of the frame member 45 to a position shown in FIG. 8 in which the horizontal portions 47b of the reinforcement plate members 47 allow inflation of the airbag 43.

Since the frame member 45 and the reinforcement plate members 47 are coupled together by means of dovetail joints, during inflation of the airbag 43, initial pressure that acts on the reinforcement plate members 47 stemming from inflation of the airbag 43 can be absorbed by means of the dovetail joints, whereby the fracture-opening subsections 46a and 46b can be opened smoothly.

The airbag case 44, which accommodates the airbag 43, is disposed below the frame member 45. Hooks 44b are fixedly provided on the side walls of the opening portion 44a of the airbag case 44. The hooks 44b are passed through and engaged with the square holes 45g of the frame member 45 and the square holes 47e of the reinforcement plate members 47. An unillustrated inflater for supplying gas to the airbag 43 is disposed at the lower end of the airbag case 44.

The airbag case 44 is fixed via a support member 48 to a stationary member of the body of the automobile, such as a cross member 49, by use of bolts and nuts 49a.

The thus-configured airbag apparatus according to the first embodiment functions in the following manner. Upon collision of the automobile, an impact force caused by the collision is detected by an unillustrated known sensor. An unillustrated control unit including a known CPU judges whether or not the detected impact force is equal to or greater than a predetermined value. When the control unit judges that the impact force is equal to or greater than the predetermined value, the control unit issues a signal for causing the unillustrated inflater to generate a predetermined gas. The gas is fed to the airbag 43 so as to promptly inflate the airbag 43 (see FIG. 8).

When pressure generated at the initial stage of inflation of the airbag 43 is imposed on the horizontal portions 47b of the reinforcement plate members 47, the fracture-opening subsections 46a and 46b welded to the horizontal portions 47b of the reinforcement plate members 47 sequentially fracture along the center fracture groove 40b and the side fracture grooves 40c. Then, as shown in FIG. 8, the horizontal portions 47b of the reinforcement plate members 47 joined to the fracture-opening subsections 46a and 46b are opened outward in opposite directions while being turned inside out about the bent portions 47a, each of which serves as a hinge. In this state, the engagement projections 47d of the reinforcement plate members 47, which are fitted into the dovetail grooves 45f of the frame member 45, can move upward slightly. Therefore, during the initial stage of inflation, pressure that acts on the bent portions 47a can be absorbed by means of the dovetail joints between the frame member 45 and the reinforcement plate members 47. Further, during the final stage of inflation, that pressure can be absorbed by the gaps between the hooks 44b and the wall surfaces of the square holes 45g of the frame member 45. This pressure-absorbing mechanism can prevent generation of damage to the circumferential edge of the opening of the instrument panel cover 40, to thereby enable the fracture-opening subsections 46a and 46b and the horizontal portions 47b of the reinforcement plate members 47 to smoothly open in a casement condition as shown in FIG. 8.

In the present invention, the frame member 45 and the reinforcement plate members 47 are coupled by means of dovetail joints; and the square holes 47e formed in the vertical portions 47c of the reinforcement plate members 47, which portions are continuous with the horizontal portions 47b via the bent portions (hinges) 47a, are rendered greater in opening area than the square holes 45g of the frame member 45 in such a manner that the lower edges of the square holes 47e are located below those of the square holes 45g. The above configuration enables the hinges to move upward to thereby suppress impact force which would otherwise act on the welding portion between the front and rear fracture-opening subsections 46a and 46b and the horizontal portions 47b of the reinforcement plate members 47 upon opening of the fracture-opening subsections 46a and 46b.

Further, in the first embodiment, since a portion of the instrument panel cover 40 around the fracture-opening section 46 (hereinafter referred to as an "opening surrounding portion") is welded to the reinforcement edge portions 45b and 45c of the frame member 45, the opening surrounding portion is prevented from following the opening displacement of the fracture-opening section 46, so that when the air bag 43 inflates, the fracture-opening section 46 quickly fractures along the fracture grooves 40c into the fracture-opening subsections 46a and 46b. Therefore, the fracture surfaces (peripheral end surfaces) of the fracture-opening subsections 46a and 46b are prevented from having sharp edges or burrs.

Further, since the opening surrounding portion extending along the fracture grooves 40a and 40c is reinforced by the reinforcement edge portions 45b and 45c, the instrument panel cover 40, including the fracture-opening section 46, has an enhanced resistance to pressing force that is applied to the instrument panel cover 40 from above, to thereby prevent breakage or deformation of the instrument panel cover 40 during periods in which the airbag is not operated.

In the first embodiment, the frame member 45 and the reinforcement plate members 47 are formed of a thermoplastic resin material as in the case of the instrument panel cover 40, and are fixed to the instrument panel cover 40, by means of vibration welding, via the ridges 45d formed on the reinforcement edge portions of the frame member 45 and the ridges 47g formed on the horizontal portions of the reinforcement plate members 47. Thus, the work for welding the frame member 45 and the reinforcement plate members 47 to the instrument panel cover 40 is facilitated.

In the first embodiment, the frame member 45 is made of a thermoplastic resin material having high rigidity, and the reinforcement plate members 47 are made of a thermoplastic resin material having low rigidity. However, both the frame member 45 and the reinforcement plate members 47 may be made of a thermoplastic resin material having low rigidity or a thermoplastic resin material having high rigidity. Alternatively, the frame member 45 may be made of a thermoplastic resin material having low rigidity, and the reinforcement plate members 47 may be made of a thermoplastic resin material having high rigidity.

The airbag case 44 is separably connected to the frame member 45 and the reinforcement plate members 47. Thus, when a car is to be scrapped, the airbag case 44 can be easily detached from the frame member 45 and the reinforcement plate members 47, so that an inflater and other relevant components, which are categorized as industrial waste, can be easily removed for proper disposal to thereby prevent potential environmental contamination.

Figure 9:
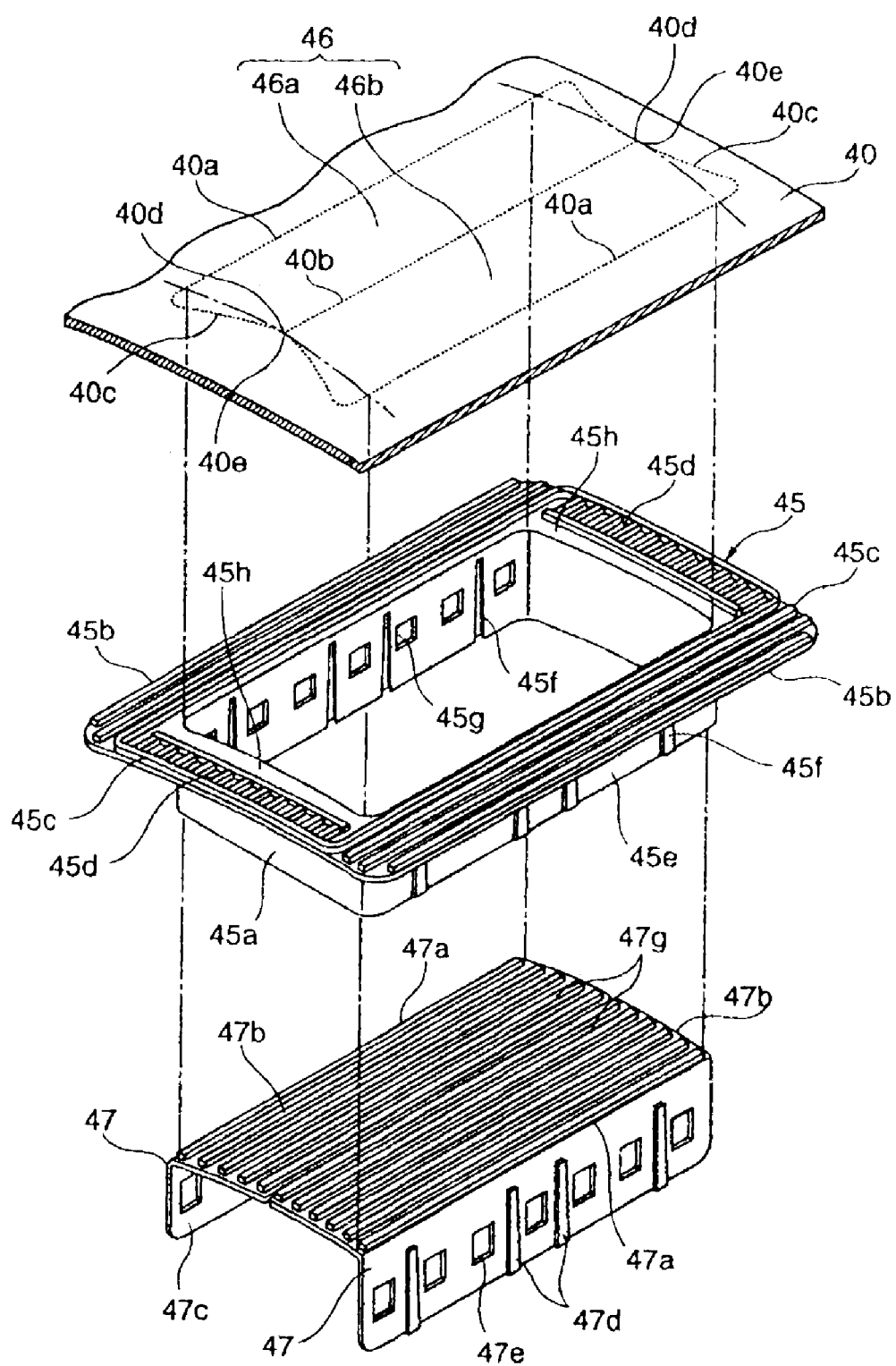
FIG. 9 is an exploded perspective view of a frame member and a reinforcement plate member of an airbag apparatus for an automobile according to a second embodiment of the present invention and applied to use with a front passenger seat.

FIG. 9 is an exploded perspective view of an airbag apparatus for an automobile according to a second embodiment of the present invention, showing an instrument panel cover, a frame member, and reinforcement plate members.

The airbag apparatus of the second embodiment has a structure similar to that of the first embodiment shown in FIG. 4. Therefore, portions identical to or corresponding to those of the first embodiment will be denoted by the same reference numerals, and their repeated description will be omitted. Only differences between the embodiments will be described.

As shown in FIG. 9, the side fracture grooves 40c of the fracture-opening section 46, which are formed on the inner surface of the instrument panel cover 40 by use of a laser beam, do not form straight lines but form convex curved lines 40e whose apexes coincide with the opposite ends 40d of the center fracture groove 40b.

The right and left reinforcement edge portions 45c of the frame member 45 to be welded to the inner surface of the opening surrounding portion of the instrument panel cover 40 each have a flat portion 45h. The flat portion 45h extends along the circumferential edge of the opening of the body portion 45a of the frame member 45 to be located inside of the corresponding ridges 45d. The above-described curved side fracture grooves 40c formed on the inside surface of the instrument panel cover 40 are located above the corresponding flat portions 45h. Thus, the apex portions of the curved side fracture grooves 40c are prevented from projecting into the opening of the body portion 45a of the frame member 45.

In the second embodiment, both the frame member 45 and the reinforcement plate members 47 are made of a thermoplastic resin material having low rigidity, such as olefin elastomer. Use of such thermoplastic resin material can solve the problem of cracking in a low-temperature environment, and prevents generation of burrs on the fracture surfaces of the fracture-opening section 46.

Figure 10:
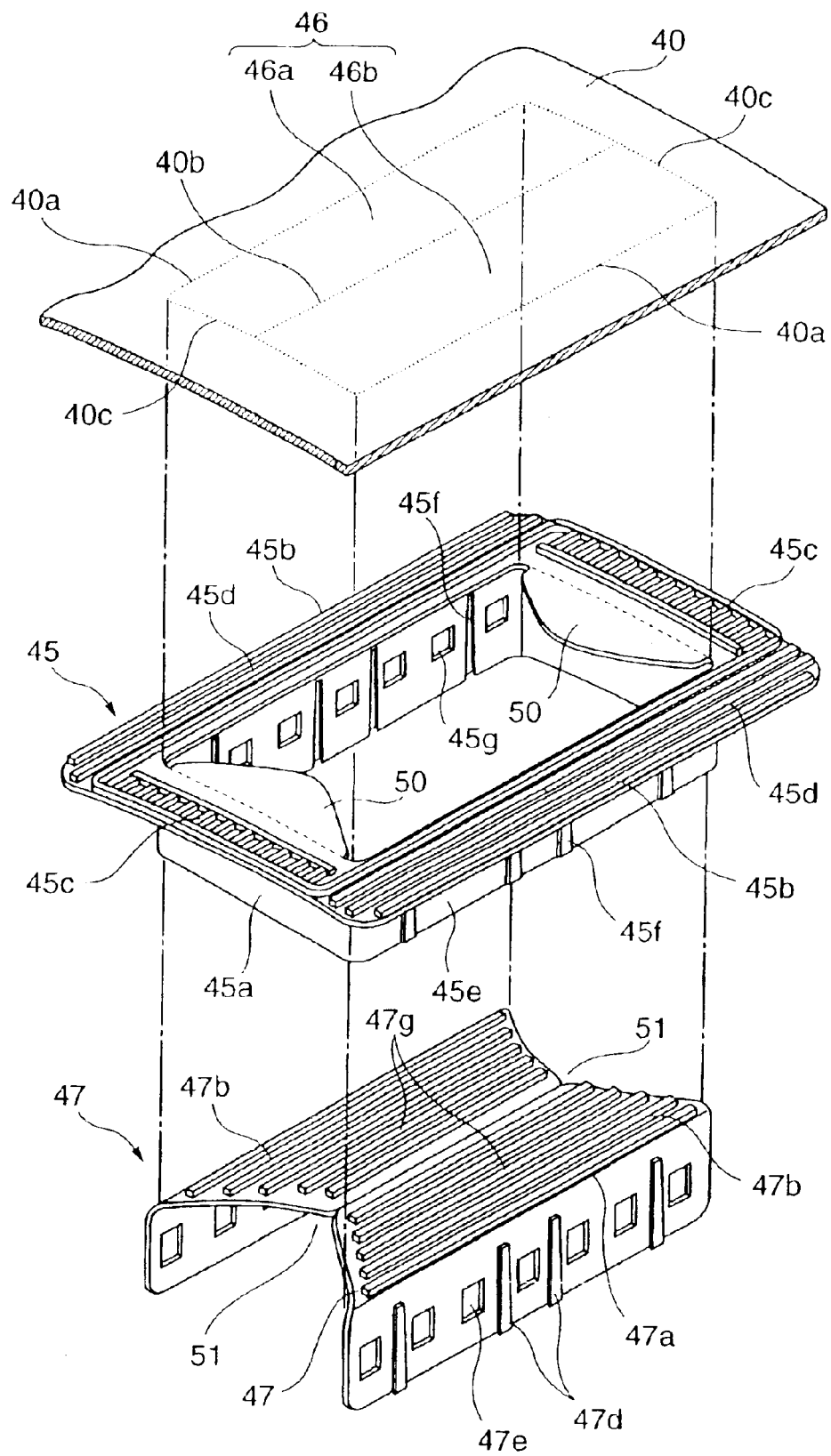
FIG. 10 is an exploded perspective view of a frame member and a reinforcement plate member of an airbag apparatus for an automobile according to a third embodiment of the present invention and applied to use with a front passenger seat.

FIG. 10 is an exploded perspective view of an airbag apparatus for an automobile according to a third embodiment of the present invention, showing an instrument panel cover, a frame member, and reinforcement plate members.

The airbag apparatus of the third embodiment has a structure similar to that of the first embodiment shown in FIG. 4. Therefore, portions identical with or corresponding to those of the first embodiment will be denoted by the same reference numerals, and their repeated description will be omitted. Only the differences between the embodiments will be described.

As shown in FIG. 10, the right and left reinforcement edge portions 45c of the frame member 45 each have an open-motion assisting projection 50 projecting toward the center of the opening of the body portion 45a of the frame member 45. Further, the horizontal portions 47b of the reinforcement plate members 47 to be fitted into the frame member 45 are cut-removed in areas corresponding to the open-motion assisting projection 50 to thereby form cut portions 51.

In this embodiment as well, both the frame member 45 and the reinforcement plate members 47 are made of a thermoplastic resin material having low rigidity, such as olefin elastomer. Use of such thermoplastic resin material can solve the problem of cracking in a low-temperature environment. Further, fracture of the fracture-opening section 46 upon inflation of the airbag reliably proceeds from the center fracture groove 40b to the side fracture grooves 40c.

The above embodiments are described while mentioning a fracture-opening section 46 which is split open in opposite directions. However, the present invention is not limited thereto and can be applied to the case where the fracture-opening section 46 is split open in a single direction. In this case, a single reinforcement plate member 47 having an appropriate shape is used.

According to the above-described embodiments, the hinge grooves 40a and the fracture grooves 40b and 40c are formed through application of a laser beam to the inside surface of the instrument panel cover 40. However, the present invention is not limited thereto. The grooves may be formed through milling. When milling is to be employed, the inside surface of the instrument panel cover is grooved in such a manner as to leave a wall thickness of 0.5 mm–0.8 mm on the front surface side of the instrument panel cover. Alternatively, the grooves may be integrally formed in the course of molding of the instrument panel cover.

Obviously, numerous modifications and variations of the present invention are possible in light of the above teachings. It is therefore to be understood that within the scope of the appended claims, the present invention may be practiced otherwise than as specifically described herein.

What is claimed is:

1. An airbag apparatus for an automobile, comprising:
   an airbag case for accommodating an airbag in a folded condition, the airbag case being disposed behind a surface panel which is made of a thermoplastic resin material and provided within the automobile;
   a fracture opening section of the surface panel, the fracture-opening section facing an opening of the airbag case and being defined by means of fracture grooves formed on an inside surface of the surface panel;
   at least one reinforcement plate member fixed to the inside surface of the surface panel in a region corresponding to the fracture-opening section; and
   a frame member surrounding the reinforcement plate member and fixed to the inside surface of the surface panel in a region surrounding the fracture-opening section, the frame member including a tubular body portion extending substantially perpendicular to the fracture-opening section and to which a vertical portion of the reinforcement plate member is connected, and reinforcement edge portions extending outward from the body portion, facing the inside surface of the surface panel, and fixed by means of vibration welding to the inside surface of the surface panel in a region surrounding the fracture-opening section, wherein the frame member and the reinforcement plate member are each made of a thermoplastic resin material and are fixed to the inside surface of the surface panel through vibration welding, the frame member and the vertical portion of the reinforcement plate member are coupled with each other by means of a dovetail joint, and rectangular holes for receiving and holding hooks of the airbag case are formed in the body portion of the frame member and the vertical portion of the reinforcement plate member at positions corresponding to those of the hooks.

2. An airbag apparatus according to claim 1, wherein:
   the rectangular holes formed in the vertical portion of the reinforcement plate member are greater in opening area than the rectangular holes formed in the body portion of the frame member; and
   lower edges of the rectangular holes formed in the vertical portion of the reinforcement plate member are located below lower edges of the rectangular holes formed in the body portion of the frame member when the reinforcement plate member is coupled to the frame member.

3. An airbag apparatus according to claim 1, wherein:

the fracture-opening section is rectangular, and a center fracture groove and side fracture grooves are formed on the inside surface of the surface panel, the side fracture grooves defining shorter sides of the fracture-opening section, and the center fracture groove extending along a longitudinal direction of the fracture-opening section and dividing the fracture-opening section into two subsections;

the frame member has a rectangular upper opening corresponding to the rectangular fracture-opening section;

the at least one reinforcement plate member includes two reinforcement plate members, each having rectangular horizontal portions fixed to the two subsections, respectively;

the frame member has open-motion assisting projections which project inward from opposite edges, respectively, of the upper opening of the frame member, which edges correspond to the shorter sides of the fracture-opening section; and the horizontal portions of the reinforcement plate members are partially cut in order to form cut portions corresponding to the open-motion assisting projections.

4. An airbag apparatus according to claim 1, wherein:

the fracture-opening section is quadrangular, and a center fracture groove and side fracture grooves are formed on the inside surface of the surface panel, the side fracture grooves defining shorter sides of the fracture-opening section, and the center fracture groove extending along a longitudinal direction of the fracture-opening section and dividing the fracture-opening section into two subsections;

the at least one reinforcement plate member includes two reinforcement plate members, each having horizontal portions fixed to the two subsections, respectively;

the frame member has reinforcement edge portions extending along the shorter sides of the fracture-opening section;

the side fracture grooves are curved so as to form convex curved lines whose apexes coincide with opposite ends of the center fracture groove;

the reinforcement edge portions each have a flat portion and ridges to be welded to the inside surface of the surface panel, the flat portions extending along the circumferential edge of an opening of the frame member, and the ridges being formed outside the flat portions; and the curved side fracture grooves are located above the corresponding flat portions in such a manner that apex portions of the curved side fracture grooves do not project into the opening of the frame member.

\* \* \* \* \*